3,743,585
METAL RECOVERY PROCESS
Edward Harris Lowenhaupt III and Edward Edmunds, Jr., El Paso, Tex., assignors to S.E.C. Corporation, El Paso, Tex.
Continuation-in-part of application Ser. No. 86,526, Nov. 3, 1970. This application Oct. 12, 1971, Ser. No. 188,472
Int. Cl. C22d 1/14; C22b 43/60
U.S. Cl. 204—112
5 Claims

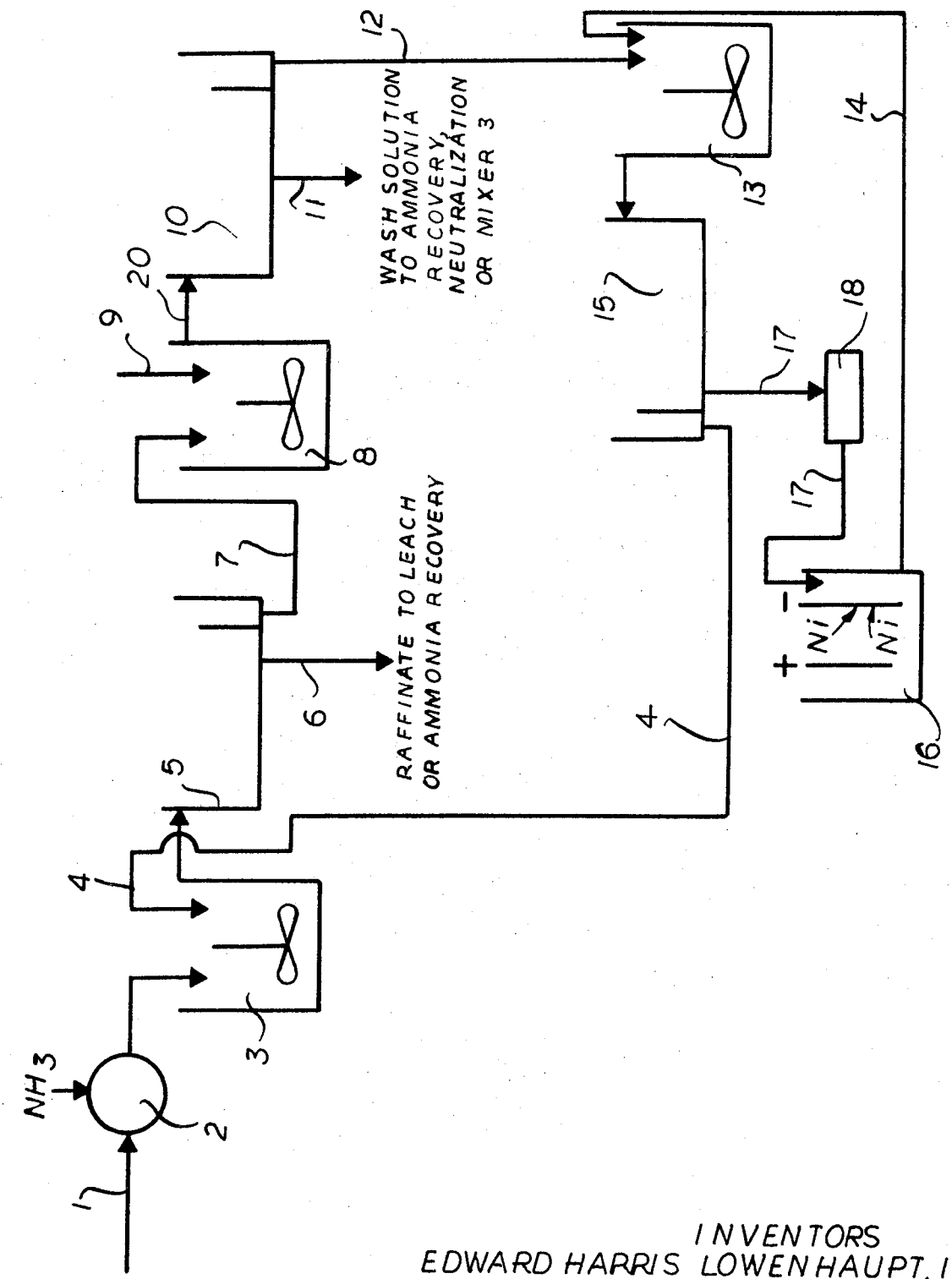

ABSTRACT OF THE DISCLOSURE

A process for electrolytic deposition of nickel wherein nickel is extracted from a nickel-containing liquor by contacting said liquor with an ion exchange medium to bond nickel to said material; nickel is stripped from said ion exchange material by contact with an aqueous mineral acid electrolyte solution having a pH of about 0.5 or higher; the stripped ion exchange medium is again contacted with nickel-containing liquor for extraction of additional nickel; the nickel pregnant aqueous mineral acid electrolyte solution from said stripping operation is subjected to electrolysis to deposit metallic nickel and the electrolyte solution resulting from said electrolysis is recycled to the stripping operation at a rate sufficient to simultaneously remove nickel from the ion exchange medium and to reduce the hydrogen ion concentration of the aqueous electrolyte solution.

---

This application is a continuation-in-part of our copending application Ser. No. 86,526 filed Nov. 3, 1970, now abandoned.

This invention relates to a process for extracting nickel from aqueous solutions thereof and depositing nickel by electrolysis.

The principal object of this invention is to provide an improved process for extracting nickel values from aqueous solutions and recovering nickel in high purity by electrowinning (electrolysis).

The electrochemical reactions which take place during electrowinning of nickel are as follows:

At the cathode:

$$Ni^{++} + 2e \rightarrow Ni^{\circ}$$

At the anode:

$$2H_2O \rightarrow 4H^+ + O_2 + 4e$$

For a net cell reaction of:

$$2Ni^{++} + 2H_2O \rightarrow 4H^+ + O_2 + 2Ni$$

As will be seen from the above equation, two moles of hydrogen ion are produced for each mole of nickel. Since nickel is above hydrogen in the electromotive series, electrolysis of a solution of nickel and hydrogen ions tends to selectively reduce hydrogen instead of nickel by the competing reaction:

$$2H^+ + 2e \rightarrow H_2$$

The reason the nickel may be electroplated at all from acid solutions is that in practice, the flow of current may be increased until through electrode polarization, the voltage becomes so much greater than the hydrogen overvoltage (voltage at which hydrogen is reduced in significant quantity) that nickel is also reduced. Nevertheless, it remains necessary to maintain the hydrogen ion concentration at as low a level as possible in order to minimize the competing reaction at the cathode between nickel and hydrogen.

Previous methods of maintaining a low hydrogen ion concentration in the vicinity of the cathode have generally involved adjusting the pH through neutralization of the electrolyte or by separating the anode and cathode by some means such as a somewhat porous diaphragm, bag, or similar porous partition and maintaining a continuous flow through the partition from cathode to anode. The acid which is formed at the anode is excluded by the diaphragm from the vicinity of the cathode. In such methods, the anolyte (solution adjacent to the anode) must continually be withdrawn for neutralization and purification.

By means of the present invention, it is not necessary to employ means such as diaphragms and the like to separate the anode and cathode nor continually withdraw the anolyte for neutralization. The novel process of the present invention comprises contacting an aqueous nickel-containing solution or liquor preferably at an alkaline pH (the extraction efficiency being lower at pH values below 7) with an α-hydroxy oxime extractant to extract nickel, with the nickel being bonded to the extractant. In addition to the preferred α-hydroxy oxime extractants, other solid or liquid ion exchange resins can be employed in accordance with this invention. Suitable ion exchange resins are those which are capable of being stripped of nickel at relatively high pH values, that is, at values at least no lower than pH 0.5. Such resins include for example, Amberlite IRC-50 (available commercially from Rohm & Haas Co.) which is a solid cation exchange resin containing carboxylic acid functionality and Kelex 120 (available commercially from Ashland Chemical Co.), a liquid cation exchange reagent which is an 8-hydroxy quinoline derivative.

The nickel-loaded extractant is then subjected to stripping with an aqueous mineral acid electrolyte solution having a pH of 0.5 or higher to obtain a nickel-enriched electrolyte solution. The stripped extractant is recycled to the extracting operation while the nickel-enriched electrolyte solution is subjected to electrolysis to deposit metallic nickel at the cathode with resulting regeneration of an equivalent amount of hydrogen ion. The spent electrolyte solution from the electrolysis is recycled to the stripping operation to strip nickel from the extractant and to simultaneously reduce the hydrogen ion concentration of the aqueous electrolyte solution.

The α-hydroxy oxime extractants employed in accordance with this invention and their preparation are described in U.S. Pat. No. 3,224,873 to Ronald R. Swanson, issued Dec. 21, 1965. As described therein, the α-hydroxy oxime extractants have the following general formula:

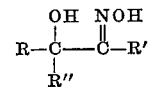

where R, R' and R" may be an organic hydrocarbon radical, such as aliphatic and alkaryl radicals. R" may also be hydrogen. The preferred extractants are those wherein R and R' are the same and are unsaturated hydrocarbon or branched chain alkyl groups of from 6 to 20 carbon atoms, and R" is hydrogen or is similar to R or R'.

Nickel ion will be extracted by these extractants in acid solution at reduced efficiency. Therefore, the nickel-containing liquor is preferably either basic, or is made alkaline by addition of a base such as ammonia, prior to entering the extraction process. Since nickel will precipitate as nickel hydroxide at pH's above about 6.5, and as the preferred pH's for extraction are 8.0 and above, a complexing agent must be utilized to hold the nickel in solution. The preferred agent is ammonia, which acts both as a base for pH adjustment and as a complexing agent for nickel through formation of nickel-ammine complexes.

Formation of nickel-ammine complex may be represented by the following general equation:

$$Ni^{++} + xNH_3 \rightarrow Ni(NH_3)_x^{++}$$

where $x = 2-6$.

Extraction of the nickel by the extractants is believed to proceed through a complexing mechanism. The reaction could be represented as:

$$Ni(NH_3)_6^{++} + 2HR \rightarrow NiR_2 + 2NH_4^+ + 4NH_3$$

where R = organic molecule.

Stripping of the nickel-loaded extractant with an acid electrolyte can be represented as follows:

$$NiR_2 + 2H^+ \rightarrow Ni^{++} + 2HR$$

The α-hydroxy oxime cation exchange extractants are employed in the present process in the form of a solution in an organic solvent of aliphatic or aromatic hydrocarbons such as kerosene or Napoleum 470. The amount of the α-hydroxy oxime extractant dissolved in the organic solvent can vary widely and is generally about 2 to 30% by volume. The extraction is carried out at normal ambient temperatures and at an alkaline pH, preferably above 8. This pH can be achieved conveniently by the introduction of ammonia prior to extraction. The quantity of α-hydroxy oxime extractant or other suitable extractant to employ for the extraction depends upon the concentration of nickel in the feed solution and sufficient of the extractant is employed to achieve the desired extraction of nickel.

The process of this invention will now be described in detail in conjunction with the drawing which is a schematic flow diagram. Thus, an aqueous solution containing nickel which, for example, can be a dilute aqueous ammoniacal or acid solution resulting from leaching of a nickel ore, flows via line 1 through an ammoniator 2, where the pH is raised to about 8.5. The ammoniacal stream then flows into an extractor 3 which can comprise a suitable tank equipped with agitating or mixing means so as to obtain intimate contact between the aqueous nickel-containing solution and the nickel-extracting α-hydroxy oxime extractant.

The extractant in the hydrogen ion form is introduced into extractor 3 through line 4 where it is contacted with the nickel feed solution. The mixed phases then flow to settling tank 5, where they separate and are withdrawn on opposite sides of a weir arrangement. The aqueous phase or raffinate, which constitutes the water from which essentially all of the nickel has been extracted, is withdrawn through line 6 and can be processed for recovery of ammonia or recycled to the leaching operation, for example. The organic phase containing the extractant to which nickel is attached can, if desired or necessary, be sent via line 7 to wash tank 8 wherein it is subjected to washing to remove, for example, ammonia if it is found that ammonia is being transferred to the stripping operation. The carry over of substantial amounts of ammonia from the nickel extraction operation may result in the formation of crystals of insoluble salts such as nickel ammonium sulfate in the stripping zone which is undesirable. Conventional mixer-settler equipment can be employed in this step. Preferably, the wash water introduced through line 9 contains a small amount, as for example, 15 grams per liter or greater, of an electrolyte, such as ammonium sulfate, or equivalent amounts of other electrolytes such as sodium sulfate, sodium chloride or ammonium chloride, and is introduced at a flow rate sufficient to remove any ammonia associated with the organic phase.

The contents of wash tank 8 are transferred through line 20 to settler 10. Wash water separated from the organic in settler 10 can be removed via line 11 and combined with the feed to extraction tank 3, or may be treated for ammonia recovery. The washed organic solution is sent via line 12 to stripping tank or mixer 13. In stripping tank 13, the α-hydroxy oxime extractant is contacted with an aqueous mineral acid electrolyte solution introduced through line 14.

It is a principal feature of this invention that the nickel-loaded extractant is stripped of its nickel value in tank 13 by an electrolyte at or greater than pH 0.5. The presence of a relatively small concentration of hydrogen ion (0.0315 gram per liter at pH 1.5) minimizes the previously described competing reaction between nickel and hydrogen ions during electrowinning so that nickel may be deposited with minimal evolution of hydrogen. Current efficiencies of 80% and greater are easily obtained in an electrolyte at pH 1.5.

Our discovery that the nickel-bearing ion exchange extractants can simultaneously replenish the electrolyte with nickel at high purity while removing hydrogen ion formed during electrolysis affords significant advantages as will be discussed hereinafter.

Thus, spent electrolyte from electrolytic cell 16 is contacted with nickel-bearing extractant in mixer 13 and the phases are separated in settler 15. It is preferred that the pH of the electrolyte solution be in the range of about 1.5 to 2.0 since the stripping efficiency decreases at substantially higher pH values. Generally, the volume ratio of the aqueous mineral acid electrolyte solution to the extractant solution employed in stripping will range from about 1.25 to 2.25, although other aqueous to organic ratios may be employed with satisfactory results.

The extractant solution from which the nickel has been stripped is continuously recycled to the nickel extraction tank 3 through line 4 while the nickel pregnant electrolyte solution is sent via line 17 to the electrolytic cell 16 wherein electrolysis is conducted. It is preferred that the electrolyte be filtered and treated to remove organic and other contaminants at point 18 prior to returning to cell 16. Electrolysis is conducted in electrolytic cell 16 under conditions so as to deposit a ductile deposit of metallic nickel at the cathode. The electrolysis conditions can vary but in practice will generally be as follows:

|  | Range |
| --- | --- |
| Amperes/square feet | 15–40 |
| Voltage | 2.5–4.0 |
| Temperautre (° C.) | 50–60 |

The spent electrolyte resulting from the electrolysis is continually recycled through line 14 to stripping zone 13 wherein it contacts additional nickel-bearing α-hydroxy oxime extractant to strip the nickel therefrom. In so doing, the hydrogen ions replace the nickel on the α-hydroxy oxime extractant and the pH of the electrolyte is maintained at the desired level of 0.5 or above. By circulating the electrolyte in this manner, a relatively uniform high pH is maintained in the electrolyte undergoing electrolysis with the result that production of hydrogen gas is minimized.

Moreover, to increase the efficiency of the nickel stripping action of the electrolyte in stripping zone 13, small amounts of weak mineral acids having a buffering effect such as hydrosulfate ion ($HSO_4^-$), phosphoric acid or boric acid can be present in the electrolyte. Such acids provide additional hydrogen ions which replace nickel on the organic extractants whereby a greater amount of nickel can be stripped therefrom with a given amount of electrolyte than is expected on the basis of the change in pH. Thus, when using a volume ratio of electrolyte to α-hydroxy oxime extractant of 1.33:1 in the stripping zone, a change in pH of from 1.5 to about 1.8 accomplished the stripping of two grams/liter of nickel. The change in hydrogen ion concentration corresponding to this change in pH would indicate that one equivalent of hydrogen ion stripped 3.25 equivalents of nickel, whereas the chemical requirement is that one equivalent of hydrogen ion must strip one equivalent of nickel ion. Evidently there is more hydrogen ion available in the electrolyte than is indicated by pH, which probably results from the partial secondary ionization of $H_2SO_4$ to $H^+$ and $HSO_4^-$. In the preferred case, the release of $H^+$ from $HSO_4^-$ with rising pH is probably the major contribution to the unexpected increased stripping efficiency, although we do not wish to be bound by this hypothesis.

A summary of a typical operation of the process of this invention is as follows:

|  | Flow, ml./ minute | Nickel, grams/ liter | pH |
|---|---|---|---|
| Feed solution (Line 1) | 130 | 6.5 | 8.3–8.5 |
| Raffinate (Line 6) | 130 | 0.002 | 8.8 |
| Wash water (20 grams $(NH_4)_2SO_4$/ liter) (Line 9) | 100 |  |  |
| Loaded organic [1] (Lines 7 and 12) | 420 | 2.8 |  |
| Stripped organic [1] (Line 4) | 420 | 0.8 |  |
| Electrolyte (50 grams $H_3BO_3$/liter $H_2O$) (Nickel present as the sulfate) pregnant electrolyte (Line 17) | 560 | 100.5 | 1.70–1.95 |
| Spent electrolyte (Line 14) | 560 | 99 | 1.48–1.57 |
| Electrolytic cell (16): |  |  |  |
| Total cathode area, sq. ft | 1.60 |  |  |
| Average amps/ft.$^2$ | 35 |  |  |
| Average volts | 3.7 |  |  |
| Temperature, °C | 52–56 |  |  |
| Current efficiency, percent | 82 |  |  |

[1] 15% by weight of General Mills LIX64N in 85% hydrocarbon solvent.

The extraction of nickel by other cation exchange resins and the stripping of nickel therefrom at relatively high pH values are exemplified in the following examples:

EXAMPLE 1

50 ml. of an ammoniacal nickel sulfate solution at pH 8.5 was mixed using mild agitation with 20 ml. of Amberlite IRC–50 resin in the hydrogen form. Mixing time was one-half hour at temperatures between ambient and 50° C. The resin was then filtered from the solution and washed with 150 ml. of water until no nickel was present in the wash water. The combined 200 ml. of feed and wash solution contained 1.7 g./l. Ni, indicating that 1.3 meq./ml. of Ni had been bound to the resin.

The washed resin was stripped by mixing with 50 ml. of a commercial pH 2.0 buffer solution. The pH rapidly rose to about 4.5, and dilute (about 5%) $H_2SO_4$ was added to hold the pH at 1.5–2.0. Otherwise, mixing conditions were the same as during the extraction step. Total volume of strip and wash solution was 560 ml., containing 1.2 g./l. Ni.

This washed resin was then mixed with 150 ml. of 10% $H_2SO_4$ at 50° C. for ten minutes, yielding 150 ml. of 0.54 g./l. Ni solution.

|  | Vol., ml. | Anal., g./l. | Total Ni, g. | Remarks |
|---|---|---|---|---|
| Feed solution | 50 | 22 | 1.10 | pH 8.5. |
| 1st wash | 200 | 1.7 | .34 |  |
| 1st strip | 50 | 0 | 0 | pH 2.0 buffer. |
| 2nd wash | 560 | 1.2 | 0.67 |  |
| 2nd strip | 150 | 0.54 | 0.08 | 10% $H_2SO_4$. |

Thus, 68% of the feed nickel was extracted by the resin, and of the total extracted, 89% was stripped using a solution at a pH of 1.5 to 4.5, 11% of the nickel loaded remained on the resin and was stripped by strong acid.

EXAMPLE 2

100 ml. of a 15% solution of Kelex 120 in Napoleum 470 was shaken in a separatory funnel with 30 ml. of a 22 g./l. ammoniacal nickel sulfate solution. Shaking time was 2½ minutes. An excess of nickel feed solution was used in order to approximately fully load the Kelex with nickel.

The organic phase loaded to 3.2 g./l. was shaken with 100 ml. of a commercial nickel electrolyte, containing 60 g./l. of Ni as the sulfate at a pH of 1.4. After stripping the organic phase held 1.2 g./l. of Ni and the pH of the aqueous phase was 1.65.

EXAMPLE 3

One hundred ml. of a 15% solution of Kelex 120 was shaken for 2½ minutes with 10 ml. of a 22 g./l. ammoniacal nickel sulfate solution. The organic phase loaded to about 2.2 g./l. The organic phase was stripped as in Example 2 to a nickel load of 0.3 g./l.

It should be appreciated that the scope of this invention is not limited by the type or configuration of the equipment employed. Persons skilled in the art will readily recognize, for example, that the mixer-settler system employed may include more stages than illustrated, or may be replaced by equipment such as in-line mixers, centrifugal contactors, pulsed columns an dthe like, without changing the nature of the process.

It is not necessary that the aqueous nickel-bearing feed solution be of any special degree of purity as the extractants will generally selectively extract nickel from other metal values likely to be present therewith except possibly for copper, cobalt and zinc. In any event, if it is found that other metals are present with the nickel, which metal values are extracted by the extractants employed, such metals as for example copper, cobalt and zinc can be isolated by chemical or other techniques known to those skilled in the art.

The process of this invention affords significant advantages. Thus, the disclosed process provides an electrolyte of high purity and low hydrogen ion concentration thereby eliminating the need for porous bags or diaphragms between anode and cathode. This is an important advantage over prior art processes which call for anode and cathode compartments separated by porous dividers and an electrolyte distribution system arranged to provide a positive flow across the dividers from cathode to anode. This directional flow in the prior art processes is necessary to prevent impurities and acid (which is formed at the anode) in the anolyte from coming in contact with the cathode. The process of the invention eliminates the expense attending the use of bags or diaphragms and the elaborate electrolyte distribution system of the prior art processes. Moreover, the elimination of the use of bags also may result in reduced power costs by reducing the resistance between the electrodes. Moreover, since the partitioned cell is eliminated a much higher electrolyte circulation rate can be employed so that higher current densities are possible. Current prior art employs current densities of about 17 amperes/square foot for electrowinning of nickel, whereas the present invention yields excellent results with current densities of 35 amperes/square foot and higher. This, of course, provides inventory. In addition, the elimination of bags or diaphragms permits closer spacing of anode and cathode with attendant reduction of voltage and power costs as well as reduction of plant size and electrolyte inventory. Cathode-to-cathode spacings of four inches or less are feasible, as opposed to conventional spacings of five inches or more.

Those modifications and equivalents which fall within the spirit of the invention are to be considered a part thereof.

What is claimed is:

1. A process for electrolytic deposition of nickel which comprises:
   (a) extracting nickel from a nickel-containing solution by contacting said solution with an ion exchange resin to bond nickel to said resin,
   (b) stripping nickel from said nickel-bearing resin by contacting said resin with an aqueous mineral acid electrolyte solution having a pH not lower than about 0.5 or substantially higher than 4.5 to obtain a nickel-enriched aqueous mineral acid electrolyte solution.
   (c) recontacting the stripped resin from said stripping operation with nickel-containing solution for extraction of additional nickel, (d) subjecting the nickel-enriched aqueous mineral acid electrolyte solution from said stripping operation to electrolysis to deposit metallic nickel, and (e) recycling the electrolyte solution resulting from said electrolysis to said stripping operation at a rate sufficient to simultaneously remove nickel from the said resin and reduce the hydrogen ion concentration of the aqueous electrolyte solution.

2. The process according to claim 1 wherein the aqueous mineral acid electrolyte solution employed for stripping contains a weak mineral acid having a buffering effect.

3. A process according to claim 1 wherein the said resin having nickel bonded thereto is washed prior to being stripped.

4. A process according to claim 1 wherein stripping nickel from said resin is carried out with an aqueous mineral acid electrolyte solution having a pH of about 1.5 to 2.0.

5. A process according to claim 1 wherein the said ion exchange resin is an α-hydroxy oxime resin having the formula:

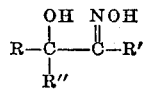

wherein R and R' are organic hydrocarbon radicals and R" is hydrogen or an organic hydrocarbon radical.

References Cited

UNITED STATES PATENTS

| | | | |
|---|---|---|---|
| 1,389,829 | 9/1921 | Heberlein | 204—112 |
| 1,887,037 | 11/1932 | Peek et al. | 204—112 |
| 2,954,276 | 9/1960 | Hazen | 75—119 X |
| 3,003,866 | 10/1961 | Mattano | 75—119 X |
| 3,085,054 | 4/1963 | Thornhill | 75—119 X |
| 3,479,378 | 11/1969 | Orlandini et al. | 75—119 X |
| 3,224,873 | 12/1965 | Swanson | 204—106 |

FREDERICK C. EDMUNDSON, Primary Examiner

U.S. Cl. X.R.

75—119